United States Patent [19]

Ikeda

[11] Patent Number: 5,579,488
[45] Date of Patent: Nov. 26, 1996

[54] PROGRAMMABLE CONTROL DEVICE

[75] Inventor: Keiichi Ikeda, Kawasaki, Japan

[73] Assignee: Canon Kabushiki Kaisha, Tokyo, Japan

[21] Appl. No.: 402,977

[22] Filed: Mar. 13, 1995

Related U.S. Application Data

[63] Continuation of Ser. No. 941,785, Sep. 8, 1992, abandoned.

[30] Foreign Application Priority Data

Sep. 9, 1991 [JP] Japan ................................. 3-256007
Aug. 25, 1992 [JP] Japan ................................. 4-225983
Aug. 25, 1992 [JP] Japan ................................. 4-225984

[51] Int. Cl.⁶ .................................................. G06F 13/00
[52] U.S. Cl. ........................... 395/280; 395/281; 395/822
[58] Field of Search ................................. 395/281, 282, 395/290, 306, 308, 280; 371/8.1, 8.2, 9.1; 340/745

[56] References Cited

U.S. PATENT DOCUMENTS 4,497,038  1/1985  Diepold-Scharnitzky et al. .... 395/325
4,667,289  5/1987  Yoshida et al. ........................ 395/750
4,695,944  9/1987  Zandveld et al. ..................... 395/281
4,747,073  5/1988  Desbois et al. ....................... 395/281
4,805,085  2/1989  Mogi et al. ............................ 371/8.2
4,912,633  3/1990  Schweizer et al. ................... 395/800
4,942,391  7/1990  Kikuta .................................... 340/745
5,086,499  2/1992  Mutone .................................. 371/8.1
5,202,980  4/1993  Morita .................................... 371/8.1
5,210,756  5/1993  Kummer et al. ...................... 371/8.1
5,299,322  3/1984  Arai et al. ............................. 395/275
5,454,084  9/1995  Uchikoga .............................. 395/281

Primary Examiner—Ayaz R. Sheikh
Attorney, Agent, or Firm—Fitzpatrick, Cella, Harper & Scinto

[57] ABSTRACT

A programmable control device has a control unit that is separated from a unit to be controlled. The control unit and the unit to be controlled are detachably connected via a connection unit. The control unit is modified to provide improved functionality while effectively using the existing hardware of the unit to be controlled. The control unit may have a card-like shape to reduce the size of the programmable control device.

31 Claims, 10 Drawing Sheets

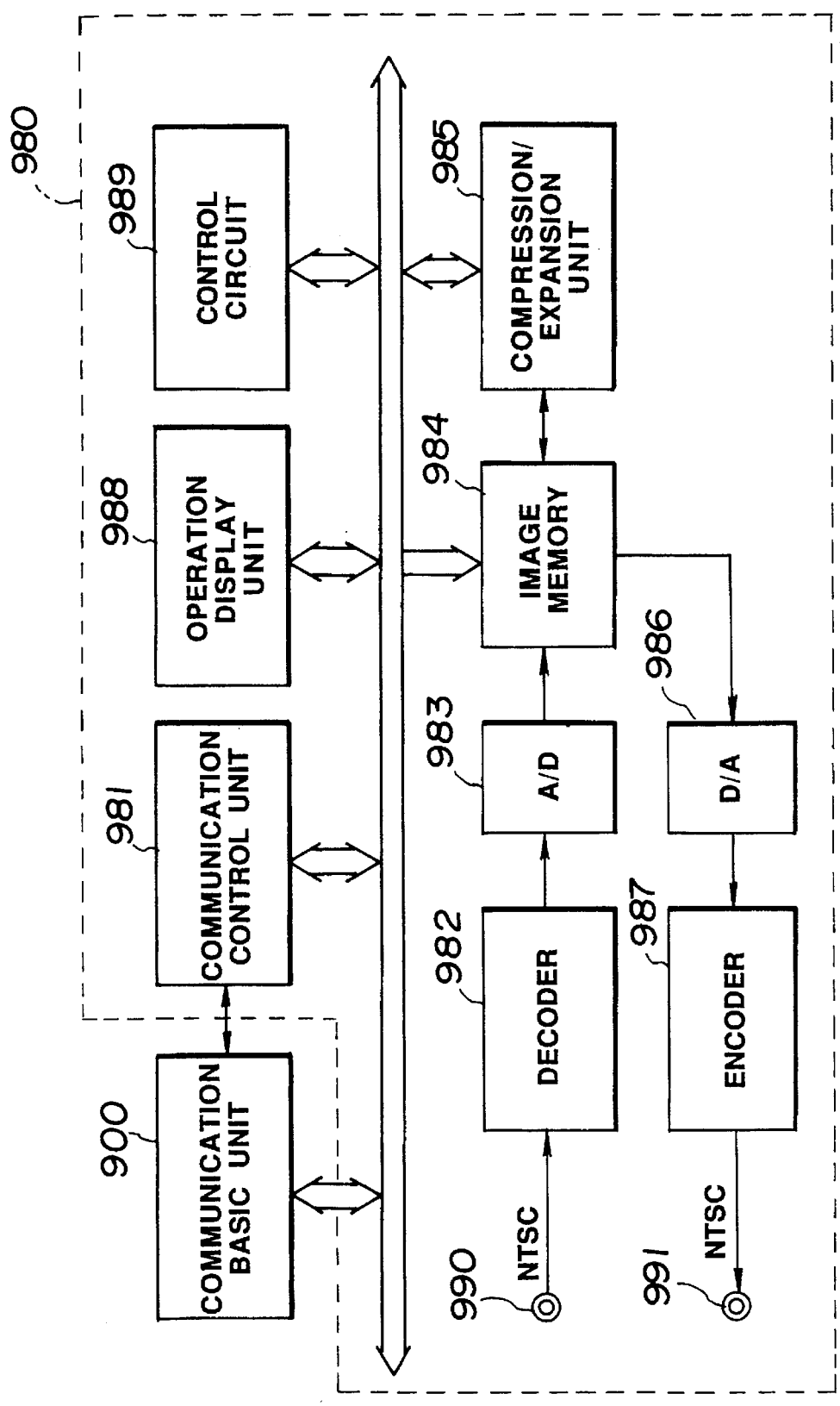

PROGRAMMABLE CONTROL DEVICE

This application is a continuation of U.S. patent application Ser. No. 07/941,785 filed Sep. 8, 1992, now abandoned.

BACKGROUND OF THE INVENTION

1. Field of the Invention

This invention relates to a programmable control device, and more particularly, to a device whose control unit is connected to a general-purpose bus to externally control a controlled unit.

2. Description of the Related Art

Heretofore, two types of devices each of which incorporates a control function have been known, i.e., a type in which the operational function of the device is controlled by hardware logic, and a type in which control programs and a CPU (central processing unit) are incorporated within the device, and the CPU controls the operational function of the device according to the control programs. The latter type device includes an arrangement for externally inputting a control program for a computer or the like, whereby the device can have an entirely different function by use of the input control program although the same hardware is used.

FIG. 3 is a block diagram showing an example of the configuration of a conventional programmable control device.

In FIG. 3, a CPU 201 controls the entire device by interpreting and executing programs stored in a ROM (read-only memory) 202. A RAM (random access memory 203 functions as a work memory to be used when the CPU 201 performs its operation. The ROM 202 and the RAM 203 are selected by addresses output from the CPU 201 to an address bus S201. When the ROM 202 is selected, the contents of the memory are output to the data bus S202. When the RAM 203 is selected, data are input and output via the data bus S202. A first I/O unit (input/output interface unit) 204 is selected by an I/O address output from the CPU 201. The first I/O unit 204 controls an information display unit 205 by transmitting control data output from the CPU 201 to the information display unit 205. A second I/O unit 208 controls an information output unit 207 by transmitting control data output from the CPU 201 to the information output unit 207, in the same manner as the first I/O unit 204. Thus, information is output to a mechanism control unit (not shown) provided within the device, or outside of the apparatus. A third I/O unit 208 outputs control information and other information from an information input unit 209 to the CPU 201. A fourth I/O unit 210 outputs control information and other information detected by an information detection unit 211 to the CPU 201.

However, even a device which can be controlled by inputting a control program from the outside (a programmable control device) has the problem that it becomes obsolete within a very short time in accordance with technical progress, since the same incorporated hardware is used.

That is, while the performance of the CPU 201, and the capacity, processing speed and the like of the memory, such as the RAM 20S, advance day by day in accordance with progress in the current semiconductor technology, a device having hardware that is fixed cannot accommodate components developed by such new technology in its structure. Accordingly, a process of developing a new device which accommodates components developed by the new technology is in many cases adopted. As a result, the lifetime of a product shipped to the market is shortened by being replaced by a next-generation product, causing waste of available resources.

SUMMARY OF THE INVENTION

The present invention has been made in consideration of the above-described problems in the prior art.

It is an object of the present invention to provide a programmable control device which can easily improve its function by effectively utilizing its existing hardware, even if the existing function of a controller or the like provided within the device becomes obsolete, by an arrangement through which a new controller can be externally connected to a bus of the device.

The invention is directed to a programmable control device in which a first control unit for controlling a device connected thereto and a first connection unit are connected to a first bus line. A second control unit that controls the first control unit and a second connection unit are connected to a second bus line. The first control unit is controlled according to information stored in the second control unit.

BRIEF DESCRIPTION OF THE DRAWINGS

FIG. 11 is a block diagram showing a sixth application illustrative of the present invention.

DETAILED DESCRIPTION OF THE PREFERRED EMBODIMENTS

Figure 1:
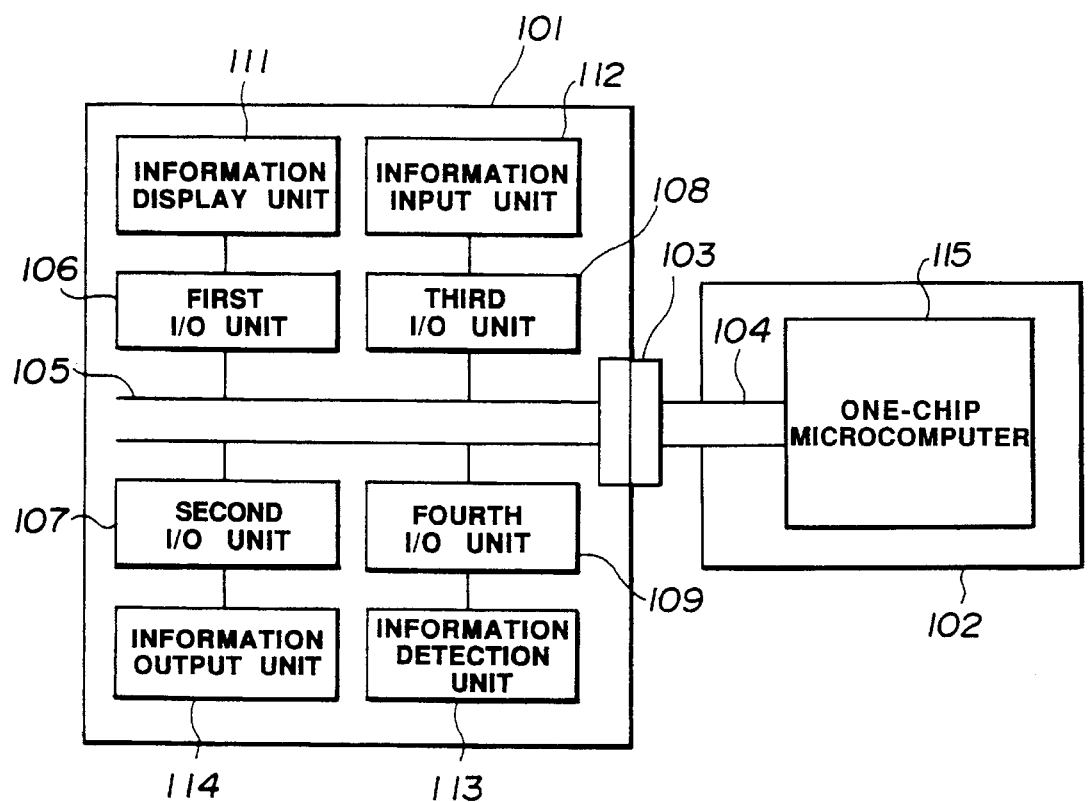
FIG. 1 is a block diagram illustrating the configuration of a principal part of a programmable control device according to an embodiment of the present invention.

FIG. 1 is a diagram illustrating the configuration of a principal part of a programmable control device according to an embodiment of the present invention. The configuration and the operation of the device will now be explained.

In FIG. 1, a unit 101 to be controlled is the main body of the device to be controlled by a programmable control unit 102. The programmable control unit 102 includes a one-chip microcomputer 115, serving as a control unit to control the controlled device 101, and peripheral circuitry, such as a clock-signal generation circuit (not shown) and the like, for operating the one-chip microcomputer 115. The one-chip microcomputer 115 includes circuitry, such as a ROM for programs, a RAM, an I/O port and the like.

A control-unit-side bus 104 is connected to a controlled-unit-side bus 105 via a connection unit 103. The one-chip microcomputer 115 can externally control the controlled unit 101 via the control-unit-side bus 104. In the present embodiment, each of the control-unit-side bus 104 and the controlled-unit-side bus 105 includes an address bus and a data bus, each having 32 bits, a power supply, and control-signal lines for memory control signals, DMA (direct memory access) control signals, interrupt control signals for the CPU, system clock signals and the like. A first I/O unit 106 displays control information and other information of the control-unit-side bus 104 received via the connection unit 103 and the controlled-unit-side bus 105 on an information display unit 111. A second I/O unit 107 outputs control information and other information of the control-unit-side bus 104 received via the connection unit 103 and the controlled-unit-side bus 105 to an information output unit 114. A third I/O unit 108 outputs information input from an information input unit 112 to the control-unit-side bus 104 via the controlled-unit-side bus 105 and the connection unit 103. A fourth i/O unit 109 outputs control information and other information detected by an information detection unit 113 to the control-unit-side bus 104 via the controlled-unit-side bus 105 and the connection unit 103.

As shown in FIG. 1, the control unit previously incorporated in the main body of the device is separated from the main body of the device, that is, the device is divided into the unit 101 to be controlled and the program control unit 102. In operating the device, the control-unit-side bus 104 is connected to the controlled-unit-side bus 105 via the connection unit 103. Hence, if the function of the CPU and the memory are significantly improved with respect to the performance of the existing hardware, the performance of the device can be increased without substantially changing configuration of the hardware of the controlled unit 101 by updating only the programmable control unit 102. It is assumed that the control-unit-side bus 104 and the controlled-unit-side bus 105 are standardized and invariable.

Thus, the programmable control device of the present embodiment is configured so that the controller of the programmable control unit controls the unit to be controlled according to control programs stored in its storage unit when the programmable control unit is connected to the unit to be controlled via the connection unit. Hence, in the programmable control device of the present invention, the unit to be controlled can execute various kinds of processing with improved functionality by instructions from an external CPU (the programmable control unit) whose function has been easily improved.

In addition, by configuring the storage unit and the controller in the form of one chip, the size of the programmable control unit can be reduced.

Figure 2:
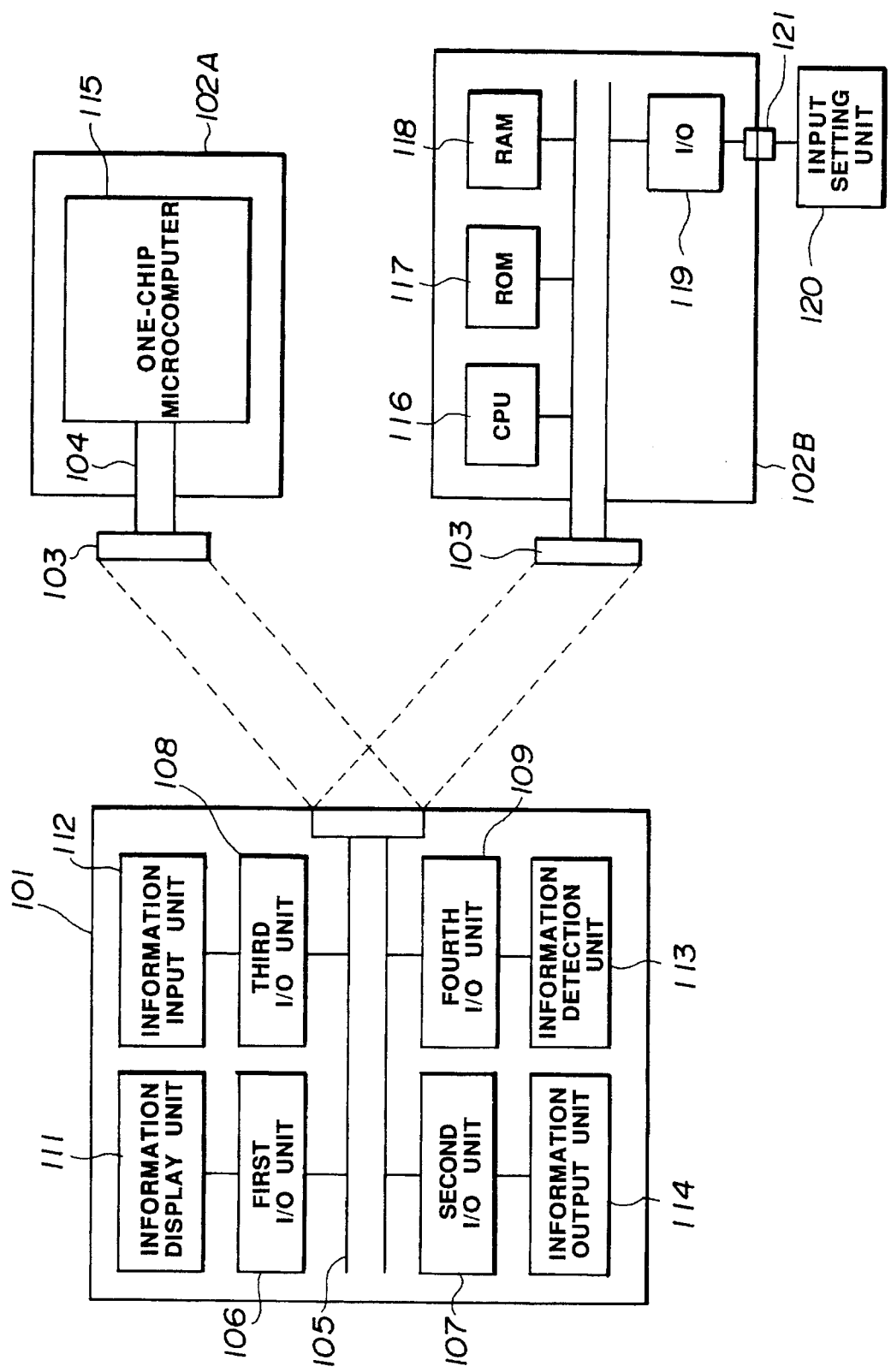
FIG. 2 is a block diagram illustrating the configuration of a principal part of a programmable control device according to another embodiment of the present invention.
Figure 3:
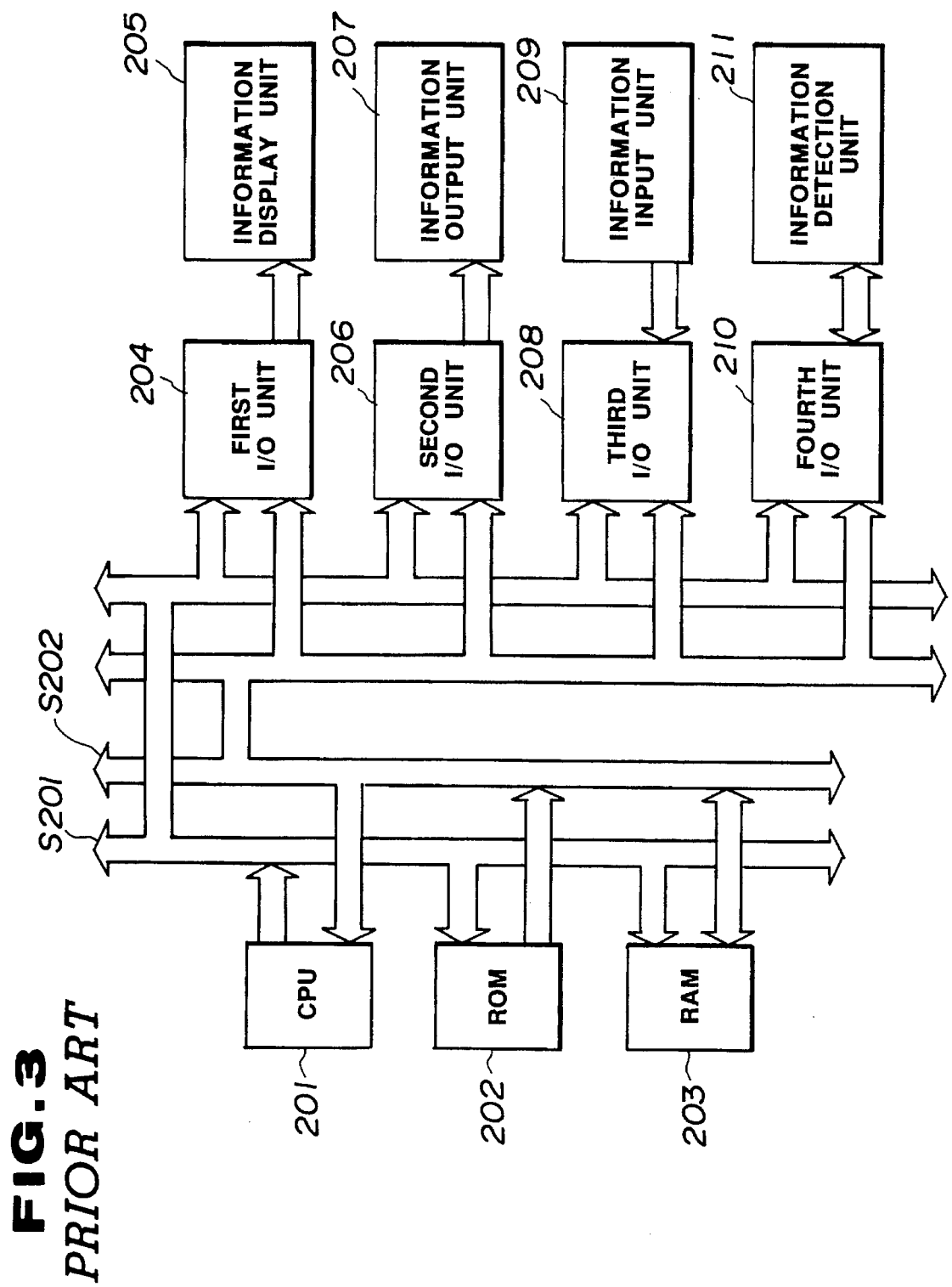
FIG. 3 is a block diagram showing an example of the configuration of a conventional programmable control device.

In the above-described embodiment, an explanation has been provided of a case in which the programmable control unit 102 is configured as the one-chip microcomputer 115. However, as shown in FIG. 2, the programmable control unit may be configured as a CPU 116, a ROM 117, a RAM 118, an I/O port 119 and the like. In this case, an input setting unit 120 or the like may be connected to the I/O port 119 via a connection unit 121 so that parameters or the like desired to be set in the RAM 118 can be arbitrarily set via the I/O port 119.

By thus configuring the programmable control unit so that arbitrary information can be set from the input setting unit 120 in the RAM 118, serving as the storage unit, it is possible to easily modify fixed parameters or the like.

FIG. 2 is a block diagram illustrating the configuration of a principal part of a programmable control device according to another embodiment of the present invention. In FIG. 2, there are shown programmable control units 102A and 102B. The programmable control unit 102A has the same function as the programmable control unit 102 shown in FIG. 1. The programmable control unit 102B can control the unit 101 to be controlled by being connected to the connection unit 103.

Figure 5:
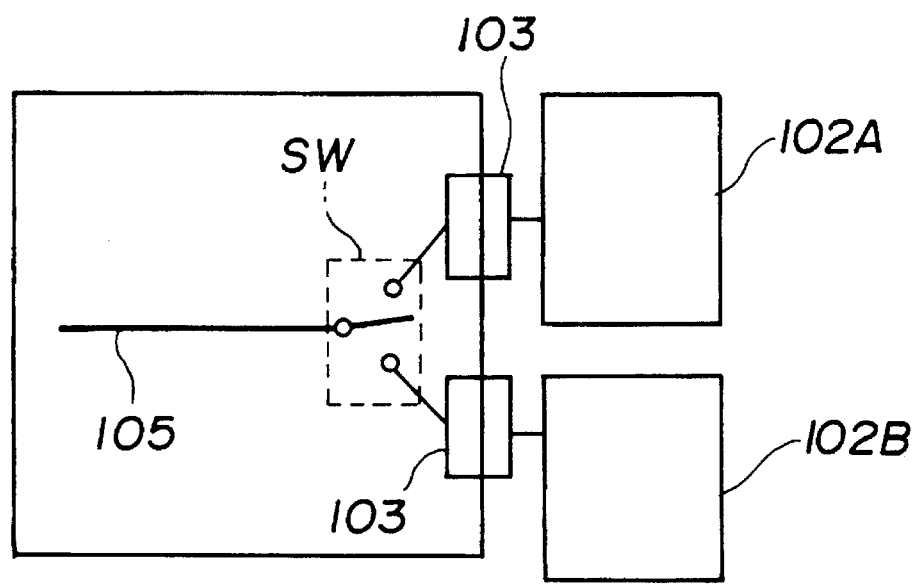
FIG. 5 is a schematic diagram illustrating still another embodiment of the present invention.

As shown in FIG. 5, a plurality of connection units 103 may be provided so that the user can select one of the programmable control units 102A and 102B by means of a DIP (dual in-line package) switch SW or the like in a state in which the programmable control units 102A and 102B are simultaneously connected to the respective connection units 103.

Figure 4:
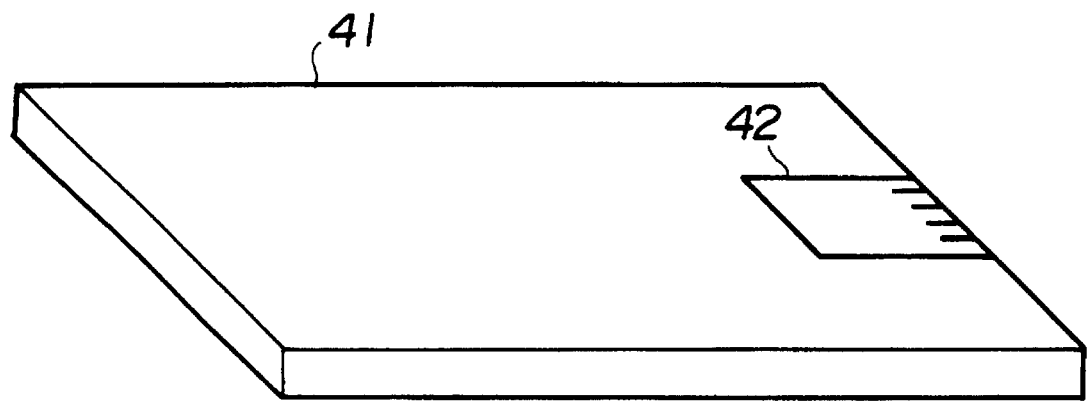
FIG. 4 is a diagram showing an external appearance of a case having a cable-like shape which accommodates the programmable control unit of the present invention.

While in the above-described embodiments, the shape of the programmable control unit is not limited, the programmable control unit may, for example, be accommodated in a box having the shape of a card shown in FIG. 4, and may be connected to the controlled-unit-side bus 105 by connecting a connector unit 42 of a card 41 to the connection unit 103.

As explained above, in the present invention, if the programmable control unit is connected to the unit to be controlled via the connection unit, the controller of the programmable control unit controls the unit to be controlled according to control programs stored in the storage unit. Hence, the unit to be controlled can be controlled according to various kinds of updated control programs by externally changing the controller without changing the configuration of the hardware of the unit to be controlled.

In addition, since the storage unit and the controller are configured in one chip, the size of the programmable control unit can be reduced.

Moreover, since the setting arrangement is connected to the programmable control unit so that various kinds of parameters or the like for the unit to be controlled stored in the storage unit can be rewritten, it is possible to set appropriate updated parameters, for example, in order to deal with a bug or the like in the control program of the programmable control unit.

Accordingly, it is possible to externally control the unit to be controlled at a processing speed corresponding to the control capability of the connected programmable control unit. Hence, processing can be performed at a speed higher than a conventional processing speed of the unit to be controlled, and therefore the unit to be controlled can execute various kinds of processing with improved functionality. Furthermore, the unit to be controlled can be used without changing the configuration of its hardware. Hence, the present invention has various advantages, such as prolongation of the lifetime of a product, and the like.

Figure 6:
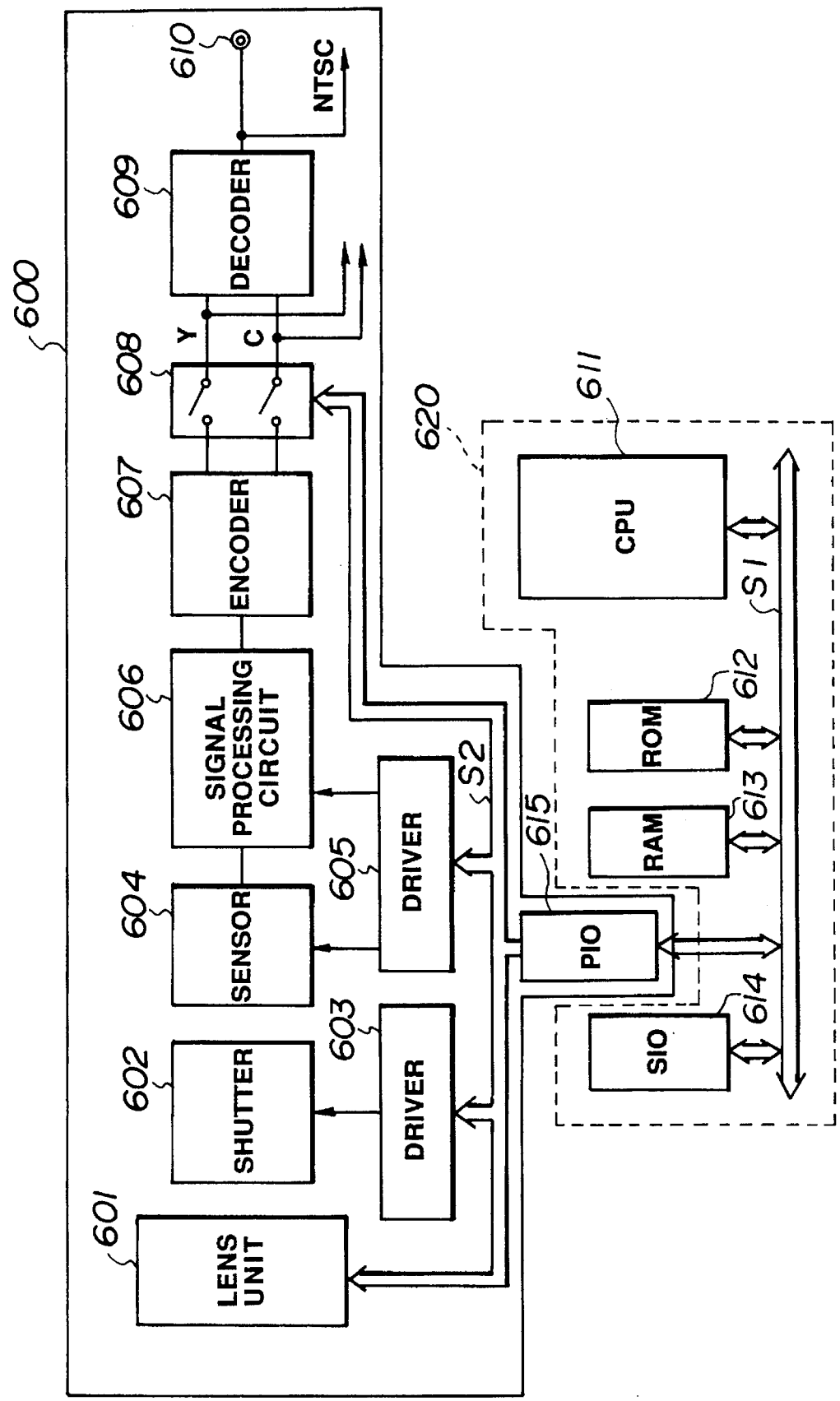
FIG. 6 is a block diagram showing a first application illustrative of the present invention.
Figure 7:
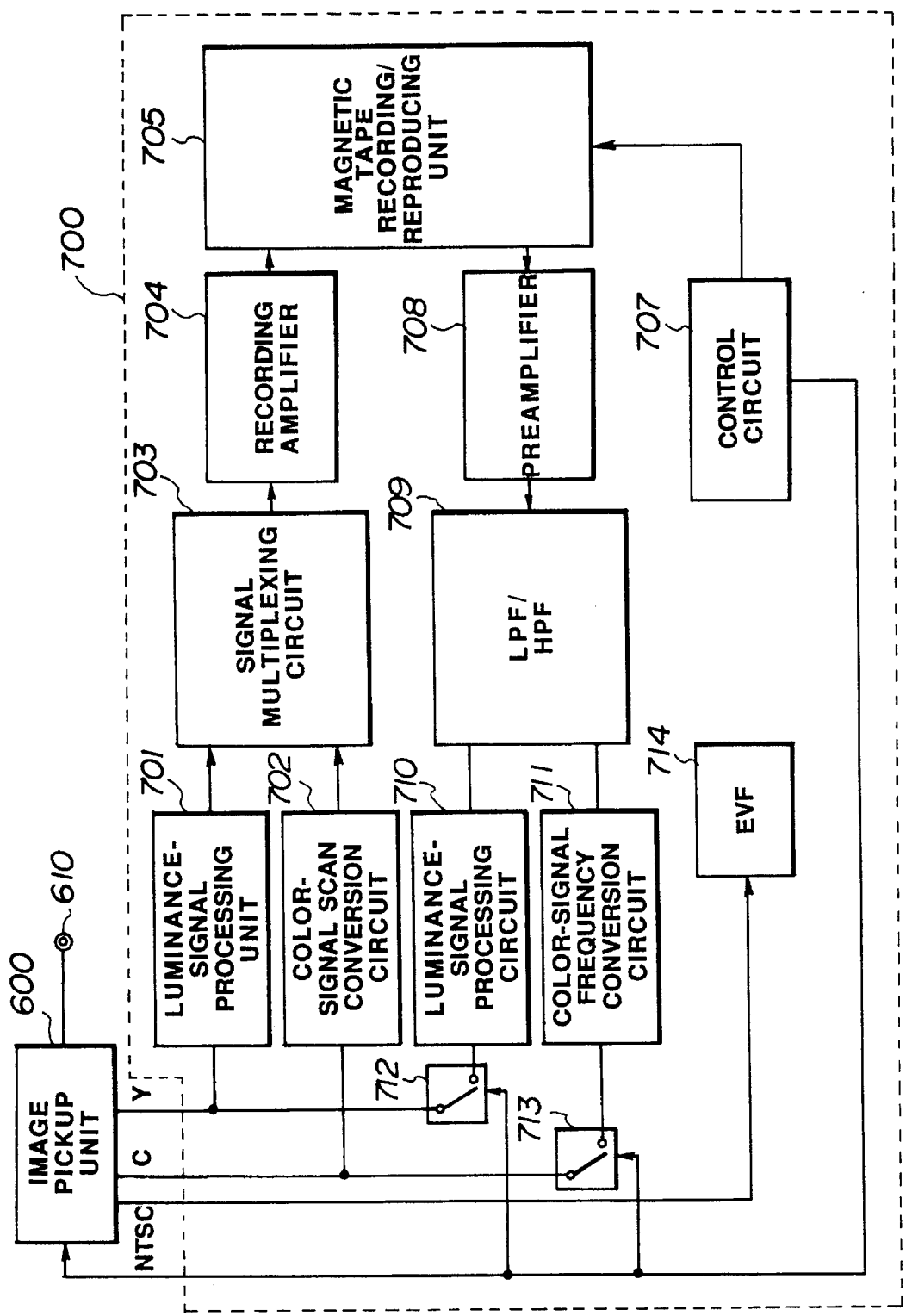
FIG. 7 is a block diagram showing a second application illustrative of the present invention.
Figure 8:
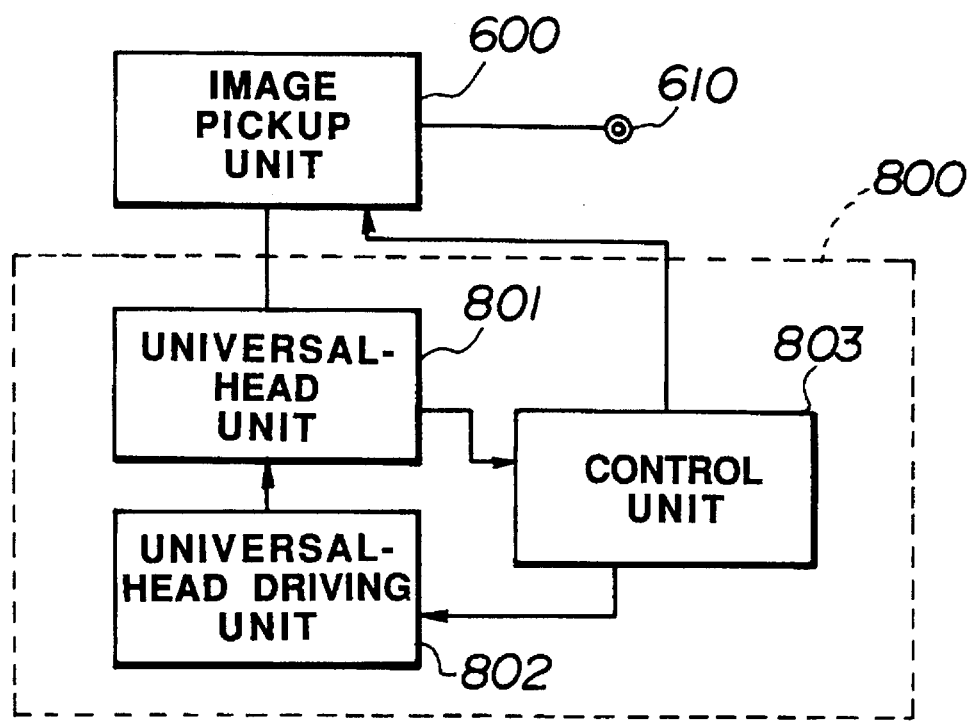
FIG. 8 is a block diagram showing a third application illustrative of the present invention.

FIGS. 6 through 8 show examples in which the present invention is applied to camera apparatuses.

FIG. 6 is a block diagram showing the configuration of the principal part of a camera apparatus as a first application illustrating the present invention.

In FIG. 6, an image pickup unit 600 which serves as a unit to be controlled has the following configuration. That is, a lens unit 601 includes an optical system for forming an image of an object, a diaphragm drive, serving as an exposure control means, a zooming function, and the like. Reference numeral 602 represents a shutter. A driver circuit 603 drives the shutter 602. A sensor 604 serves as an image pickup means, such as a CCD (charge-coupled device) or the like. A driver 605 drives the sensor 604 and a signal processing circuit 606, and performs the control of synchronization, and the like. A known encoder circuit 607 forms a Y (luminance) signal and a C (color) signal from a Y signal and R-Y and B-Y (color-difference) signals output from the signal processing circuit 606. The Y and C signals output from the encoder circuit 607 are selected by a switch 608, and converted into a composite video signal by a known decoder circuit 609. The composite video signal is supplied to an output terminal 610. Y and C signal lines at the output side of the switch 608 (the input side of the decoder circuit 609) and the composite video signal output from the decoder circuit 609 are connected to a bus line (not shown) at the side of the image pickup unit.

A PIO (parallel input/output port) 815 transmits a control signal S2 used for the control of the image pickup unit 600 by a control unit 620 to the image pickup unit 600, and is directly connected to the control unit 620 through a bus line.

The control unit 620 has the following configuration. A CPU (central processing unit) 611 controls the image pickup unit 600. A ROM (read-only memory) 612 stores operational programs for the CPU 611 and other data. A RAM (random access memory) 613, for example, temporarily stores data as a work memory. An SIO (serial input/output port) 614 is used for the input/output of serial data from a remote control (not shown) or the like by the CPU 611. In a bus S1 at the side of the control unit, are each of an address bus and a data bus comprise 32 bits. The bus S1 further includes lines for power and various kinds of control signals, such as memory control signals, DMA (direct memory access) control signals, signals to control interrupt of the CPU, system clock signals and the like. By connecting the image pickup unit 600 to the control unit 620 by a connection unit (not shown), the control unit 620 is directly connected to the bus at the side of the image pickup unit so that the CPU 611 can control the image pickup unit 600. In the present example, the control unit 620 is configured as a CPU card having a one-chip microcomputer.

FIG. 7 is a block diagram showing the configuration of the principal part of a camera apparatus as a second application illustrating the present invention.

In FIG. 7, reference numerals 600 and 610 indicate the image pickup unit and the output terminal for composite video signals shown in the first application, respectively. A control unit 700 in the second application includes a luminance-signal processing unit 701 for performing various kinds of signal processing, such as removal of noise, and the like, for the Y signal supplied from the image pickup unit 600 via the bus line, and a color-signal scan conversion circuit 702 for performing scan conversion of the C signal supplied from the image pickup unit 600. The Y signal output from the luminance-signal processing unit 701 and the C signal output from the color-signal scan conversion circuit 702 are subjected to frequency multiplexing and frequency modulation by a signal multiplexing circuit 703. The resultant signal is recorded on a magnetic tape by a magnetic tape recording/reproducing unit 705 after being amplified by a recording amplifier 704. When reproducing a signal recorded on the magnetic tape by the magnetic tape recording/reproducing unit 705, the signal read by the magnetic head of the magnetic tape recording/reproducing unit 705 is subjected to frequency demodulation by a LPF/HPF (low-pass filter/high-pass filter) circuit 709 after being amplified by a preamplifier 708, and the low-pass filter output and the high-pass filter output are taken out as a C signal and a Y signal, respectively. The Y signal taken out from the LPF/HPF circuit 709 is subjected to various kinds of signal processing by a luminance-signal processing circuit 710, and the resultant signal is input to a switch 712. The C signal taken out from the LPF/HPF circuit 709 is subjected to scan conversion to a signal having a frequency of 3.58 MHz (megahertz) corresponding to the band for the normal video color signal by a color-signal frequency conversion circuit 711, and the resultant signal is input to a switch 713.

When the magnetic tape recording/reproducing unit 705 performs a reproducing operation, the switches 712 and 713 are placed in an on-state by the control of a control circuit 707. Hence, the Y and C signals output from the luminance-signal processing circuit 710 and the color-signal frequency conversion circuit 711, respectively, are supplied to the image pickup unit 600. At that time, the switch 608 is placed in an off-state by a control signal from the control circuit 707 supplied through the bus line to the image pickup unit 600. Hence, the Y and C signals supplied from the control unit 700 to the image pickup unit 600 are converted into a composite video signal by the decoder circuit 609, and the composite video signal is output from the output terminal 610. The composite video signal output from the decoder circuit 609 is supplied to the control unit 700 connected by the bus line, and is input to an EVF (electric view finder) 714, in which a picture reproduced from the magnetic tape can be confirmed.

When the magnetic tape recording/reproducing unit 705 performs a recording operation, the switch 608 is kept to be in an on-state by the control circuit 707, whereby the Y and C signals are supplied from the image pickup unit 600 to the control unit 700. At that time, the switches 712 and 713 are kept in an off-state, and the components 701 through 705 for magnetic recording function, whereby a recording operation is performed by the magnetic tape recording/reproducing unit 705. Since image data obtained by the sensor 604 of the image pickup unit 600 is supplied from the decoder 609 to the EVF 714, an image being photographed can be confirmed in the EVF 714.

In the present example, the driver 605 within the image pickup unit 600 changes the drive for the signal processing circuit 606 so as to perform signal processing suitable for magnetic recording conversion processing by a control signal from the control circuit 707. The recording/reproducing processing in the magnetic tape recording/reproducing unit 705 and the control of an operation/display unit (not shown) are, of course, performed by the control circuit 707.

FIG. 8 is a block diagram showing the configuration of the principal part of a camera apparatus as a third application illustrative of the present invention.

In FIG. 8, reference numerals 600 and 610 indicate an image pickup unit and an output terminal having the same configuration as those shown in the first and second applications, respectively. Reference numeral 800 represents a control unit in the third illustrative application. The control unit 800 includes a universal-head unit, comprising mechanical units, for vertically and horizontally moving the image pickup unit 600. The universal-head unit 801 includes various kinds of sensors so that its positional information and the like can be read by a control circuit 803. A universal-head driving unit 802 serves as a power source for driving the universal-head unit 801 under the control of the control circuit 803. The control circuit 803 can perform ganged control of the drive of the universal-head unit 801, and operations, such as zooming, autofocusing and the like, of the image pickup unit 600 that is directly connected to the control circuit 803 by a bus line according to a signal from a remote control or an operation panel (not shown). Hence, such a camera apparatus can, for example, be used as a camera unit for a TV (television) conference.

If control programs stored in the control circuit 803 are used for controlling a monitoring camera so that the detection of movement in images (more specifically, using a difference between Y signals in adjacent frames), the drive of the universal-head unit 801 ganged with that movement, and the control of zooming are automatically performed. Accordingly, the above-described camera apparatus can be used as a monitoring-camera unit.

As explained above, in each of the above-described camera apparatuses, the image pickup unit, serving as the unit to be controlled, and the control unit for controlling the unit to be controlled are configured so as to be detachable at the bus line, and the control unit is configured in accordance with the function of each apparatus. If, for example, the control unit is provided with the function of an 8-mm video deck, an 8-mm video camera is obtained by connecting the image pickup unit, serving as the unit to be controlled, to the control unit. If the control unit is provided with the function of a universal head for a monitoring camera, a monitoring camera provided with a universal head is obtained by connecting the image pickup unit to the control unit. Accordingly, it is possible that an image pickup unit may be utilized in many product configurations which could not previously been utilized because its function in a product differs. Moreover, by exchanging only the control unit, the combined apparatus can be utilized as an apparatus providing a different function.

Figure 9:
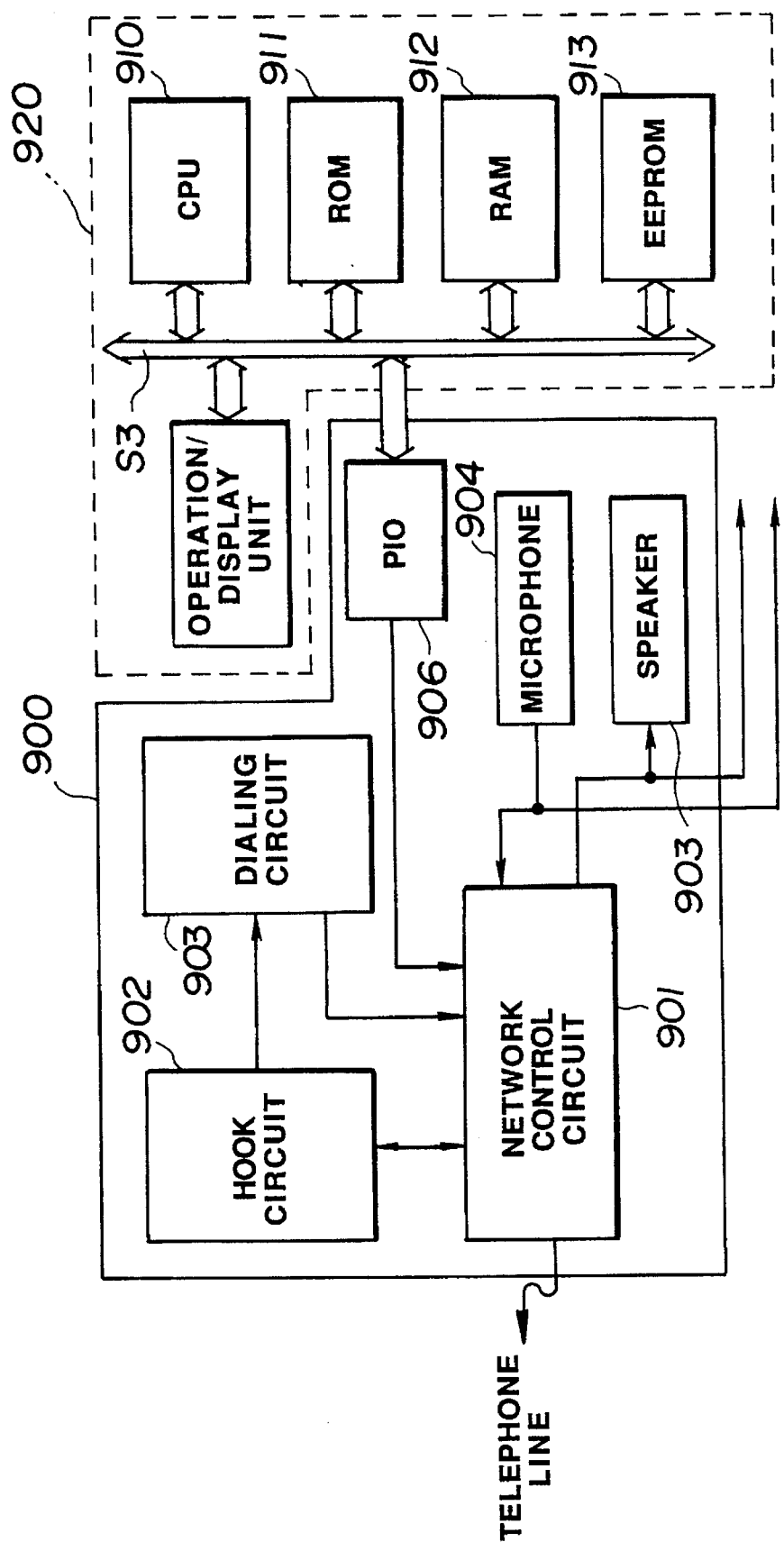
FIG. 9 is a block diagram showing a fourth application illustrative of the present invention.
Figure 10:
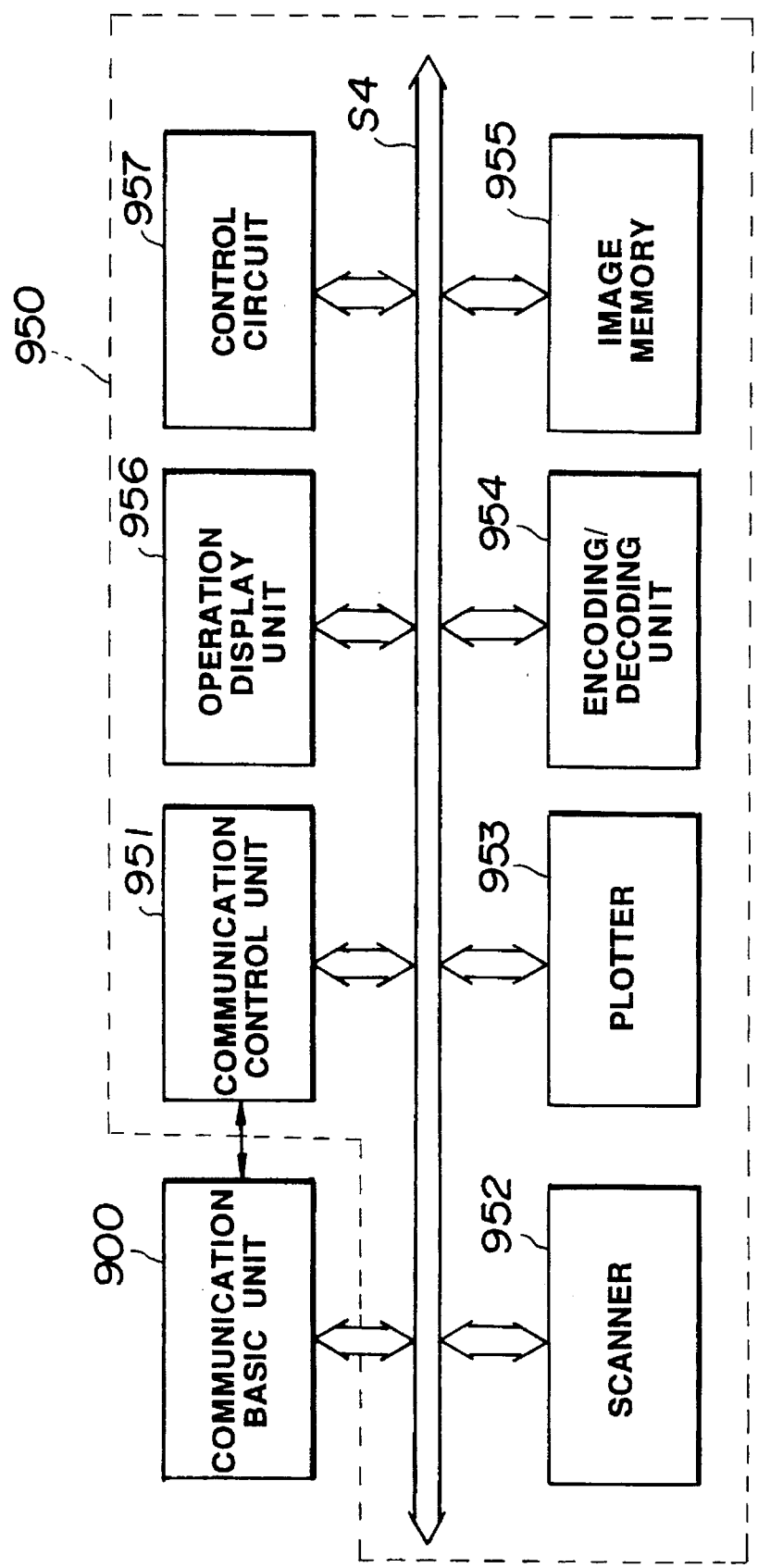
FIG. 10 is a block diagram showing a fifth application illustrative of the present invention.

FIGS. 9 through 11 show examples in which the present invention is applied to transmission apparatuses. FIG. 9 is a block diagram showing a fourth application illustrative of the present invention.

In FIG. 9, a communication basic unit 900, serving as a unit to be controlled, has the following configuration. That is, a telephone line is connected to a network control circuit 901. The network control circuit 901 performs network control in calling and reception operations, and usually comprises discrete circuitry. A hook circuit 902 sets a telephone set to an on-hook state or an off-hook state. A dialing circuit 903 forms dial pulses to be transmitted to the telephone line when the hook circuit 902 provides an off-hook state. A microphone 904 converts a voice signal into an electrical signal to be transmitted from the network control circuit 901. On the other hand, a speaker 905 converts an electrical signal reaching the network control circuit 901 into a voice signal. The PIO 906 receives a control signal from a control unit 920.

The communication basic unit 900 is detachably connected relative to the control unit 920 by a bus line. The communication basic unit 900 itself functions as a simple telephone set. By being connected to the control unit 920, the communication basic unit 900 functions as a multifunctional telephone. The control unit 920 comprises a CPU 910 for controlling the entire telephone set, a ROM 911 for storing programs for the control performed by the CPU 910 and other data, a RAM 912, serving as a memory for temporarily storing data used for the control by the CPU 910, an EEPROM (electrically erasable/programmable read-only memory) 913 capable of storing information, such as telephone numbers and the like, without using a backup power supply, an operation/display unit 914 for performing various kinds of operations instructed by the operator as well as displaying operational states of the apparatus, and a bus line S3 at the control side for connecting the above-described components. In the present example, in the bus line S3 at the control side, an address bus and a data bus have 32 bits. The bus line S3 also includes lines for power and various kinds of control signals, such as memory control signals, DMA control signals, signals to control interrupt to the CPU, system clock signals and the like, and analog signal lines, such as a transmission channel for signals to be transmitted, a transmission channel for received signals, and the like. The bus line S3 is configured so as to expandable.

Next, an explanation will be provided of a calling operation using an abbreviated dial as an example of a multifunctional telephone in a fourth application illustrative of the present invention. First, if an abbreviation dial key has been depressed as an input key on the operation/display unit 914, the CPU 910 retrieves information relating to the registered telephone number and the registered person (for example, the name, address, age, comment and the like) corresponding to the input key from within the EEPROM 913, and displays the obtained information relating to the registered person on the display unit of the operation/display unit 914. If the corresponding information cannot be found at the retrieval, a display indicating no registered information is performed. After the display of the information relating to the registered person on the operation/display unit 914, the CPU 910 converts the telephone-number data into dial pulses, which are transmitted to the network control circuit 901 via the PIO 906. The network control circuit 901 performs the same processing as that for usual dial pulses transmitted from the dialing circuit 903, whereby the dial pulses are transmitted to the telephone line.

Next, an explanation will be provided of a fifth application illustrative of the present invention in which a facsimile function is performed. FIG. 10 is a block diagram showing the principal configuration of a transmission apparatus of the fifth illustrative application. In FIG. 10, a communication basic unit 900 has the same circuit configuration as that shown in the fourth illustrative application. A control unit 950 is connected to the communication basic unit 900 by a transmission channel for signals to be transmitted and a transmission channel for received signals of a bus line. The control unit 950 comprises a communication control unit 951 for transmitting image information by modulating and demodulating it and for transmitting various kinds of procedure signals for the control of transmission, a scanner 952 for taking out image information by reading an image of an original, a plotter 953 for recording an image on recording paper, an encoding/decoding unit 954 for performing data compression of image information to be transmitted by encoding it, and for reproducing the original image information by decoding received image information, an image memory 955 for temporarily storing image information of a document to be transmitted or a received document, an operation/display unit 956 for displaying operational states of the apparatus as well as performing various kinds of operations instructed by the operator, a control circuit 957 for controlling the entire apparatus, and a bus line S4 at the control side.

By connecting the communication basic unit 900 to the control unit 950 via the bus line as shown in FIG. 10, the control circuit 957 can also control the communication basic unit 900, whereby image information read by the scanner 952 can be transmitted to the telephone line by modulating the information in the communication control unit 951 after encoding the information in the encoding/decoding unit 954.

Moreover, the control circuit 957 is adapted to receive image information transmitted from another facsimile apparatus from the communication basic unit 900 via the transmission channel for received signals on the bus line S4. The information is decoded by the communication control unit 951, and then the decoded signal is encoded by the encoding/decoding unit 954. The encoded signals are plotted by the plotter 953. Thus, received image information can be recorded on paper. In the present application, various kinds of settings, such as the selection of a normal mode or an error correction mode as the communication mode, and the like, are performed by the operation/display unit 956. Operations, such as the control of set values and the like, are, of course, performed by the control unit 957. The transmission of various kinds of procedure signals for the control of transmission in the communication control unit 951 is also performed under the control of the control circuit 957.

Next, an explanation will be provided of a sixth applicational example of the present invention in which a video image transmission function is provided. FIG. 11 is a block diagram showing the configuration of the principal part of a transmission apparatus of the sixth illustrative application.

In FIG. 11, a communication basic unit 900 has the same circuit configuration as that shown in the fourth and fifth illustrative applications. The configuration of a control unit 980 in the sixth illustrative application will now be explained.

A communication control unit 981 is connected to the communication basic unit 900 by transmission channels for transmitting and received signals of a bus line. The communication control unit 981 transmits image information by modulating and demodulating it, and also transmits various kinds of procedure signals for the control of transmission. Composite video signals are inputted through an input terminal 990. A known decoder circuit 982 forms R (red), G (green) and B (blue) signals to be transmitted from a composite video signal input to the input terminal 990. The R, G and B signals formed by the decoder circuit 982 are converted into digital data by an A/D converter 983, and are stored in an image memory 984. The image memory 984 can store images for a few frames. A control circuit 989 controls writing (storage) and reading of images. A compression/expansion unit 985 compresses image data stored in the image memory 984 that is to be transmitted and expands received image data. An operation/display unit 988 displays operational states of the apparatus, and performs various kinds of operations instructed by the operator. A D/A converter 986 converts image data stored in the image memory 984 that is to be transmitted or image data received from another video image transmitting apparatus into analog signals. An encoder 987 forms a composite video signal from the analog signals. The composite video signal formed by the encoder 987 is input to a monitoring television (not shown) or the like via an output terminal 991.

In the above-described configuration, in a transmission operation in the video image transmission function of the present invention, the operator first depresses an image-writing button on the operation/display unit 988 to write an image for one frame in the image memory 984 under the control of the control circuit 989. The image memory 984 comprises two kinds of memories, i.e., a memory for transmission and a memory for reception. An output from any of these memories can be input to the D/A converter 986 under the control of the control circuit 989. In the present application, after the image writing button on the operation/display unit 988 has been depressed, the contents of the memory for transmission are forcibly output to the D/A converter 986. Hence, the image written in the image memory 984 can be immediately confirmed by the monitoring television or the like connected to the output terminal 991.

Subsequently, by depressing a transmission button on the operation/display unit 988, image data for transmission that is written in the image memory 984 are output to the compression/expansion unit 985, where the image data are compressed. In the present application, DCT (discrete cosine transform) and Huffman coding are used as the compression method. The compressed image data are modulated by the communication control unit 981, and are transmitted to the communication basic unit 900 via the transmission channel for signals to be transmitted connected by the bus line. Thus, the image data can be transmitted to another video image transmitting apparatus via the telephone line.

In a reception operation, image data transmitted from the communication basic unit 900 via the transmission channel for received signals of the bus line are demodulated by the communication control unit 981, are expanded by the compression/expansion unit 985, and are stored in the image memory 984. In the present applicational example, the contents of the image memory for reception are output to the D/A converter 986 by the control of the control circuit 989 in the reception operation. Hence, the received image can be confirmed by the monitoring television or the like connected to the output terminal 991.

As explained above, in each of the above-described transmission apparatuses, the network interface, the telephone set and the dial transmission unit, serving as units to be controlled, and the control unit for controlling the units to be controlled are configured so as to be detachable at the bus line, and the control unit is configured in accordance with the function of each apparatus. If, for example, the control unit comprises a CPU and storage circuitry, a multifunctional telephone is obtained by connecting the units to be controlled to the control unit. If the control unit comprises a CPU, storage circuitry, a printer/scanner unit, and compression/expansion circuitry, a facsimile apparatus is obtained. Accordingly, it is possible to commonly utilize a network interface and the like which could not previously been commonly utilized because their functions as products differ. Hence, the cost of the apparatus, and the burden in the design of the apparatus can be reduced. In addition, by exchanging only the control unit, the function of the combined apparatus as a communication apparatus can be freely expanded.

What is claimed is:

1. A programmable control device, comprising:

a first bus line to which a first control unit and a first connection unit are connected, said first control unit being connected to a device and operating to control said device and said first control unit being connected to said first connection unit through the first bus; and a second bus line, to which a second control unit and a second connection unit are connected, said second control unit being connected to said second connection unit through the second bus and said first and second connection units being detachably connectable to each other, and said second control unit being coupled to the first control unit via the second bus line, the second connection unit, the first connection unit and the first bus line to control said first control unit according to information stored in a storage unit connected to said second control unit, wherein control of said device by said first control unit differs in the cases in which said second control unit is connected and in which said second control unit is not connected, respectively.

2. A programmable control device according to claim 1, wherein said second control unit, said storage unit, said second bus line and said second connection unit are accommodated within a box having the shape of a card, the second connection unit accommodated within the box being connectable to the first connection unit.

3. A programmable control device according to claim 1, wherein said second control unit and said storage unit are configured in one chip.

4. A programmable control device according to claim 3, wherein said second control unit and said storage unit configured in the one chip, said second bus line and said second connection unit are accommodated within a box having a card-like shape.

5. A programmable control device according to claim 1, further comprising a third connection unit connected to said storage unit, and an input unit to be connected to said third connection unit, for inputting information to said storage unit.

6. A programmable control device according to claim 5, wherein said second control unit controls said first control unit according to the information input to said storage unit.

7. A programmable control device comprising:

a first bus line, to which a first control unit and a switching unit are connected, said first control unit being connected to a device and operating to control said device, said first control unit being connected to said switching unit through said first bus line and said switching unit connecting one of a first connection unit and a fourth connection unit to the first bus line;

a second bus line, to which a second control unit and a second connection unit are connected, said second control unit being connected to said second connection unit through the second bus line and said first and second connection units being detachably connectable to each other, and said second control unit being coupled to the first control unit via the second bus line, the second connection unit, the switching unit and the first bus line to control said first control unit according to information stored in a first storage unit connected to said second control unit; and a third bus line, to which a third control unit and a third connection unit are connected, said third control unit being connected to said third connection unit through the third bus line and said third and fourth connection units being detachably connectable to each other, said third control unit being coupled to the first control unit via the third bus line, the third connection unit, the switching unit and the first bus line to control said first control unit according to information stored in a second storage unit connected to said third control unit, and said first control unit being controlled by one of said second control unit and said third control unit connected by said switching unit.

8. A programmable control device according to claim 7, wherein said second control unit and said first storage unit are configured in a first chip.

9. A programmable control device according to claim 8, wherein said third control unit and said second storage unit are configured in a second chip.

10. A programmable control device according to claim 9, wherein said second control unit and said first storage unit configured in the first chip, and said second bus line and said second connection unit are accommodated within a first box having a card-like shape.

11. A programmable control device according to claim 10, wherein said third control unit and said second storage unit configured in the second chip, and said third bus line and said third connection unit are accommodated within a second box having a card-like shape.

12. A programmable control device according to claim 7, wherein said second control unit, said first storage unit, said second bus line and said second connection unit are accommodated within a box having a card-like shape.

13. A programmable control device according to claim 12, wherein said third control unit, said second storage unit, said third bus line and said third connection unit are accommodated within a box having a card-like shape.

14. A programmable control device according to claim 7, further comprising a fifth connection unit connected to said first storage unit, and an input unit to be connected to said fifth connection unit, for inputting information to said first storage unit.

15. A programmable control device according to claim 14, wherein said second control unit controls said first control unit according to the information input to said first storage unit.

16. A programmable control device, comprising:

a first bus line, to which a first control unit and a switching unit are connected, said first control unit being connected to a device and operating to control said device, said first control unit being connected to said switching unit through said first bus and said switching unit connecting one of a first connection unit and a third connection unit to said first bus line; and a second bus line, to which a second control unit and a second connection unit are connected, said second control unit being connected to said second connection unit through the second bus line and said first and second connection units being detachably connectable to each other, said second control unit being coupled to the first control unit via the second bus line, the second connection unit, the switching unit and the first bus line to control said first control unit according to information stored in a first storage unit connected to said second control unit, wherein control of said device by said first control unit differs in the cases in which said second control unit is connected and in which said second control unit is not connected, respectively.

17. A programmable control device according to claim 16, wherein said second control unit and said first storage unit are configured in one chip.

18. A programmable control device according to claim 17, wherein said second control unit and said first storage unit configured in the one chip, said second bus line and said second connection unit are within a box having a card-like shape.

19. A programmable control device according to claim 16, further comprising a fourth connection unit connected to said first storage unit, and an input unit to be connected to said fourth connection unit, for inputting information to said first storage unit.

20. A programmable control device according to claim 19, wherein said second control unit controls said first control unit according to the information input to said first storage unit.

21. In a programmable control device in which a first connection unit is connected to a first control unit through a first bus and the first control unit is connected to a device, a second control unit is connected to a second connection unit through a second bus line, the second control unit being coupled to the first control unit through the second bus line, the second connection unit, the first connection unit and the first bus, and said first and second connection units being detachably connectable to each other, the method comprising the steps of:

controlling the device with the first control unit; and controlling the first control unit according to information stored in a storage unit connected to the second control unit when the second control unit is connected through the first and second connection units, wherein, the control of the device by the first control unit when the second control unit is connected differs from the control of the device by the first control unit when the second control unit is not connected.

22. The method according to claim 21, wherein said second control unit, said storage unit, said second bus line and said second connection unit are accommodated within a box having the shape of a card, the second connection unit accommodated within the box being connectable to the first connection unit.

23. The method according to claim 21, wherein said second control unit and said storage unit are configured in one chip.

24. The method according to claim 23, wherein said second control unit and said storage unit configured in the one chip, said second bus line and said second connection unit are accommodated within a box having a card-like shape.

25. The method according to claim 21, in which the programmable control device further comprises a third connection unit connected to said storage unit, and an input unit to be connected to said third connection unit, for inputting information to said storage unit.

26. The method according to claim 25, wherein said second control unit controls said first control unit according to the information input to said storage unit.

27. In a programmable control device in which a first connection unit is connected to a switching unit through a first bus line and to a device, the switching unit connecting one of the first connection unit and a third connection unit to the first bus line and in on which a second control unit is connected to a second connection unit through a second bus line, the second control unit being coupled to the first control unit via the second bus line, the second connection unit, the switching unit and the first bus line, the first and second connection units being detachably connectable to each other, the method comprising the steps of:

controlling the device with the first control unit; and controlling the first control unit according to information stored in a first storage unit connected to the second control unit when the first and second connection units are connected, wherein, the control of the device by the first control unit when the second control unit is connected differs from the control of the device by the first control unit when the second control unit is not connected.

28. The method according to claim 27, wherein said second control unit and said first storage unit are configured in one chip.

29. The method according to claim 28, wherein said second control unit and said first storage unit are configured in the one chip, said second bus line and said second connection unit are within a box having a card-like shape.

30. The method according to claim 27, wherein the programmable control device further includes a fourth connection unit connected to said first storage unit, and an input unit to be connected to said fourth connection unit, for inputting information to said first storage unit.

31. The method according to claim 30, wherein said second control unit controls said first control unit according to the information input to said first storage unit.

* * * * *

UNITED STATES PATENT AND TRADEMARK OFFICE
CERTIFICATE OF CORRECTION

PATENT NO. : 5,579,488

DATED : November 26, 1996

INVENTOR(S) : KEIICHI IKEDA

It is certified that error appears in the above-identified patent and that said Letters Patent is hereby corrected as shown below:

On the title page:

AT [56] REFERENCES CITED

U.S. PATENT DOCUMENTS

"3/1984" should read --3/1994--.

COLUMN 1

Line 31, "memory" should read --memory)--; and
Line 62, "20S," should read --203,--.

COLUMN 3

Line 25, "i/O" should read --I/O--.

COLUMN 5

Line 30, "are" should be deleted; and
Line 31, "comprise" should read --comprises--.

COLUMN 7

Line 30, "been" should read --have been--.

COLUMN 10

Line 41, "been" should read --have been--.

COLUMN 11

Line 12, "unit" (last occurrence) should read --unit are--; and
Line 13, "chip," should read --chip, and--.

UNITED STATES PATENT AND TRADEMARK OFFICE
CERTIFICATE OF CORRECTION

PATENT NO.  : 5,579,488
DATED       : November 26, 1996
INVENTOR(S) : KEIICHI IKEDA It is certified that error appears in the above-identified patent and that said Letters Patent is hereby corrected as shown below:

COLUMN 12

Line 2, "unit" (last occurrence) should read --unit are--;
　　　Line 50, "unit" (last occurrence) should read --unit are--; and
　　　Line 51, "chip," should read --chip, and--.

COLUMN 14

Line 5, "on" should be deleted; and
　　　Line 25, "chip," should read --chip, and--.

Signed and Sealed this

Twenty-third Day of September, 1997

Attest:

BRUCE LEHMAN

Attesting Officer　　　Commissioner of Patents and Trademarks